United States Patent [19]

Taha

[11] Patent Number: 5,289,458

[45] Date of Patent: Feb. 22, 1994

[54] APPARATUS FOR ACCOMPLISHING AUTOPORT SELECTION

[75] Inventor: Bassem Taha, Folsom, Calif.

[73] Assignee: Intel Corporation, Santa Clara, Calif.

[21] Appl. No.: 859,996

[22] Filed: Mar. 30, 1992

[51] Int. Cl.⁵ .............................. H04J 1/16; H04J 3/14
[52] U.S. Cl. ....................................... 370/16; 370/67;
340/825.01
[58] Field of Search ................ 370/16, 85.2, 67;
340/825.01, 827; 371/11.1, 11.2, 11.3

[56] References Cited

U.S. PATENT DOCUMENTS

| | | | |
|---|---|---|---|
| 4,365,247 | 12/1982 | Bargeton et al. | 340/825.01 |
| 4,847,837 | 7/1989 | Morales et al. | 370/16 |
| 4,891,639 | 1/1990 | Nakamura | 370/85.2 |
| 4,910,507 | 3/1990 | Shimizu et al. | 370/85.2 |

FOREIGN PATENT DOCUMENTS 2232859A 12/1990 United Kingdom .

OTHER PUBLICATIONS

U.K. Search Report, date of search May 24, 1993 of application number GB9305605.9.

Primary Examiner—Douglas W. Olms
Assistant Examiner—Ajit Patel
Attorney, Agent, or Firm—Blakely, Sokoloff, Taylor & Zafman

[57] ABSTRACT

Apparatus for automatically switching transmissions of data from a source of between a coaxial network and a twisted pair network depending on the state of the twisted pair network including apparatus for monitoring the condition of the twisted pair network to determine whether an operating network is connected, apparatus for normally connecting the output of the source of data to the twisted pair network, and apparatus for switching the output of the source of data to the coaxial network when a fault occurs in the operation of the twisted pair network.

8 Claims, 5 Drawing Sheets

APPARATUS FOR ACCOMPLISHING AUTOPORT SELECTION

BACKGROUND OF THE INVENTION

1. Field Of The Invention

This invention relates to computer systems and, more particularly, to methods and apparatus for automatically connecting computers to one of two available local area networks (LANs).

2. History Of The Prior Art

One of the significant movements in the computer industry has been toward interconnectivity of individual computers by local area networks. Initially, the desire was to allow the sharing of underused assets such as printers. More recently, the impetus has been the desire to share application programs and data and to enhance communication.

Whatever the reasons for their existence, LANs are proliferating. Typically, a LAN will be installed initially to provide connection between a small group of local computer users. The first LANs which were installed utilized coaxial cable as the physical wiring for the transmission of signals. Coaxial cable was necessary in order to reduce the noise and allow operation in the face of signal attenuation. As technology advanced and standards changed, it became possible to utilize twisted pair wiring as the physical connection to join the computers of a LAN together. Twisted pair wiring is preferred because it is less expensive and less expensive to install.

Often it is desirable to change computers from a coaxial network to a twisted pair network. During some interim period, it may be desirable to connect the computers to both networks. In a similar manner, it may become desirable to connect computers already joined in a local twisted pair network to another network in which the computers are joined by coaxial cable. In either case, it is possible that a number of individual computers will be physically connected simultaneously to two separate networks, a twisted pair network and a coaxial cable network. It is desirable that these computers be able to utilize either one of the two networks which is available and functioning so that if one network is not functioning communications will automatically be established on the other network.

SUMMARY OF THE INVENTION

It is, therefore, an object of the present invention to reduce the need for technicians to make correct connections when one of two networks to which individual computers are connected fails.

It is another object of this invention to provide apparatus for automatically connecting a computer to one of two available computer networks.

It is an additional object of the present invention to provide apparatus for automatically connecting a computer to one of two available computer networks without disturbing transmissions by computers on either of the networks.

These and other objects of the present invention are realized in apparatus for automatically switching transmissions of data from a source of data between a coaxial network and a twisted pair network depending on the state of the twisted pair network comprising means for monitoring the condition of the twisted pair network to determine whether an operating network is connected, means for normally connecting the output of the source of data to the twisted pair network, and means for switching the output of the source of data to the coaxial network when a fault occurs in the operation of the twisted pair network.

These and other objects and features of the invention will be better understood by reference to the detailed description which follows taken together with the drawings in which like elements are referred to by like designations throughout the several views.

DETAILED DESCRIPTION OF THE INVENTION

Figure 1:
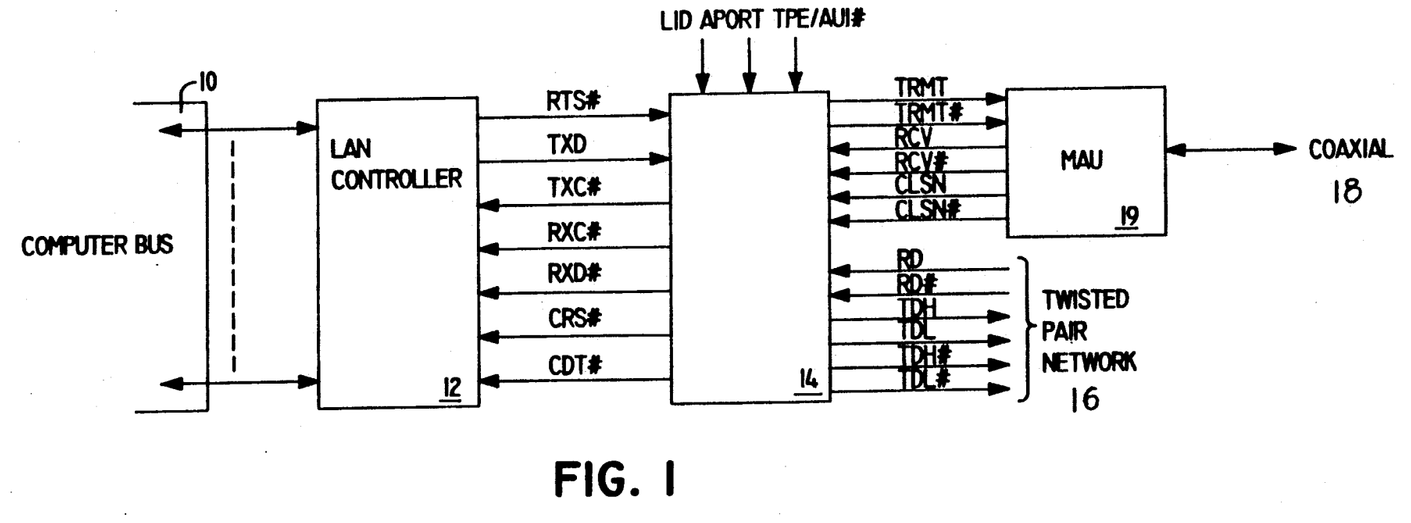
FIG. 1 is a block diagram illustrating in general an arrangement for connecting a computer to a pair of networks in accordance with the present invention.

Referring now to FIG. 1, there is illustrated a block diagram of apparatus designed according to the present invention. Shown in FIG. 1 are a computer 10 which is connected to a LAN controller 12. The LAN controller 12 is connected directly to the bus of the computer 10 so that it receives data and signals from and transmits data and signals to the computer 10 in parallel. The LAN controller 12 utilizes the data and signals it receives to generate a serial stream of data and various control signals which are transferred between the LAN controller 12 and a circuit 14 designed in accordance with the present invention. The circuit 14 generates various additional signals and transfers others to the controller 12.

The circuit 14 is adapted to automatically select either a twisted pair network 16 or a coaxial network 18 for connection to the computer 10. More particularly, in accordance with the invention, the circuit 14 will connect a computer 10 to transmit on the twisted pair network 16 as long as an active twisted pair network 16 is connected and is idle. However, if the twisted pair network 16 is (or becomes) disconnected or inoperative for some other reason (is inactive), the circuit 14 will automatically switch the connection so that the computer 10 will transmit on the coaxial network 18. In addition, if the twisted pair network 16 becomes inactive during a transmission by the computer 10, the circuit 14 switches to the coaxial network 18 in a manner that the signals transmitted from the computer 10 do not interfere with any signals which may be being transmitted by other computers on the coaxial network 18. When the fault on the twisted pair network 16 is corrected and the network 16 is restored to operation, the circuit 14 will automatically switch back to the twisted pair network 16 for transmissions by the computer 10. In addition to transmitting data from the computer 10, the circuit 14 handles the reception of data from either the coaxial network 18 or the twisted pair network 16 so that data is transferred seamlessly to the computer 10 from either network.

As illustrated in FIG. 1, a number of signals are transferred between the LAN controller 12 and the circuit 14. A request-to-send signal RTS# and a serial data stream TXD ar each sent from the LAN controller 12 to the circuit 14. The circuit 14 returns to the LAN controller 12 a transmit clock TXC#, a receive clock RXC#, serial data RXD received from a network, a carrier-sensed signal CRS#, and a collision detect signal CDT#.

In operation, the computer 10 generates a signal on the bus indicating that it desires to transmit data. The LAN controller 12 receives the signal, interprets it, and generates a request-to-send signal RTS# which is directed to the circuit 14 and is synchronized using the transmit clock signal TXC# generated by an oscillator in the circuit 14. The LAN controller 12 takes some portion of the data presented in parallel by the computer 10 and transfers that data serially to the circuit 14 as the data signal TXD, synchronizing the transmission of that data from the computer 10 using the clock TXC# from the circuit 14. The data is then transferred by the circuit 14 to the appropriate output network 16 or 18.

When data is being transmitted by the circuit 14 to the coaxial network 18, a carrier-sensed signal CRS# is generated (as will be explained) when the information is transmitted and is fed back to the LAN controller 12 to assure the LAN controller 12 that the information is being transmitted. Moreover, if, when a transmission by the computer 10 occurs, another computer is transmitting on the coaxial network 18, this is detected; and a collision detection signal CDT# is generated and transmitted back to the LAN controller 12 from the circuit 14 to indicate to the LAN controller 12 that it should cease transmitting on the coaxial network 18. When the computer 10 is receiving data from either of the networks, the circuit 14 generates a received clock signal RXC# and transfers it along with a received data signal RXD to the LAN controller 12. The LAN controller 12 converts the serial received data signals RXD into parallel data signals which are then placed on the data bus of the computer 10 when the computer 10 is ready to receive the data.

All of the operations of the LAN controller 12 are well known to the prior art and are typical of the transmission of signals by networks such as coaxial networks and twisted pair networks. The details of the control signals and the manner in which the data is transmitted are specified in IEEE Standards for Local Area Networks, Section 802.3.

The circuit 14 controls to which network the data transmitted from the computer 10 is sent. The circuit 14 is arranged to prefer the twisted pair network 16 and will transmit on that network if an operating twisted pair network is connected and idle. The circuit 14 provides a pair of differential output signals TDH and TDH# to the twisted pair network 16 as a first differential serial output stream of data, and a second pair of differential output signals TDL and TDL# as a second differential serial output stream of data. The two sets of differential data signals are provided in accordance with the Twisted Pair Ethernet protocol of IEEE Standards for Local Area Networks, Section 802.3, to allow the integrity of the data transmitted to be tested. The circuit 14 similarly receives a pair of signals RD and RD# from the twisted pair network 16 which together provide a differential serial input stream of data for the computer 10. This stream of data is used by the circuit 14 to generate the received data stream RXD and its associated clock RXC#.

The circuit 14 detects whether there is an existing operating network on the twisted pair network 16. It accomplishes this by detecting the incoming differential signals RD and RD# on the twisted pair network 16. According to the Twisted Pair Ethernet protocol, if no data is being transferred on the network, signals called "link beats" are generated specifically to allow testing for network integrity. If neither data nor link beats are detected, either no network is connected or the network is not operating; and the circuit 14 switches the output to the coaxial network 18. In accordance with the present invention, the circuit 14 will not switch from an attempt to transmit data on the twisted pair network 16 to transmit data on the coaxial network 18 until the LAN controller 12 ceases any transmission in progress from the computer 10. Since the transmission of a particular packet of data being sent on the twisted pair network 16 cannot be completed correctly anyway when a fault occurs in the twisted pair network 16, it is necessary that the packet be sent again. Consequently, there is no reason to immediately transfer the transmission to the coaxial network 18 since the information remaining in the packet which could be sent by such a procedure is valueless anyway. Furthermore, delaying the switch of the transmission until the circuit is idle may prevent the collision of transmitted data with other data on the coaxial network 18 as will be explained.

Similarly, if a fault on the twisted pair network 16 is corrected during a period in which data is being transmitted by the LAN controller 12 through the coaxial network 18, the switch back to the twisted pair network 16 is controlled by the circuit 14 so that it occurs only during a period in which the twisted pair network link is idle.

When the circuit 14 is connected to transmit data to the coaxial network 18, a pair of signals TRMT and TRMT# establish a differential serial output data stream. These signals are transferred to a medium attachment unit interface (MAU) transceiver circuit 19 which transfers the data to the coaxial network 18. The MAU transceiver circuit 19 is a transceiver which receives and transmits data to and from the coaxial network 18. The data received from the coaxial network 18 is in differential form and is transferred by the MAU transceiver circuit 19 to the circuit 14 as the signals RCV and RCV#. Also generated by and transferred from the MAU transceiver circuit 19 to the circuit 14 are two differential signals CLSN and CLSN# which are generated to provide an indication that more than one computer is transmitting on the coaxial network 18 during any interval in which the computer 10 is attempting to transmit. The MAU transceiver circuit 19 furnishes the collision signals by measuring the voltage level of the coaxial network 18. When a single computer is transmitting on the coaxial network 18, the coaxial network 18 is at a first voltage level while when more than one computer is trying to transmit at the same time, a wired AND circuit (or similar arrangement) pulls down the level of the carrier. This change in voltage level is detected and used in a manner well known to the art to generate the collision signals to warn the computer 10 to cease transmitting.

The MAU transceiver circuit 19 is used throughout the industry to implement the transmission of signals on a network such as the coaxial network 18. The construction and operation of MAU transceiver circuit 19 is well known to those skilled in the art and is not discussed further in this specification (e.g., 3COM 2239-XX). However, two aspects of the MAU transceiver circuit 19 are important to the present invention. First, the MAU transceiver circuit 19 allows the integrity of a signal transmitted from the computer 10 to be tested by sending back the data during transmission as signals RCV and RCV# to the circuit 14. The circuit 14 detects the return of the data which it has transmitted and generates a carrier-sensed signal CRS# which indicates to the LAN controller 12 that the connection to the network has been established and the data is being transmitted. Second, the MAU transceiver circuit 19 detects the presence of more than one computer on the network attempting to transmit data, and generates the differential pair of collision signals. These signals cause the circuit 14 to generate a collision signal CDT# which is sent to inform the LAN controller 12 that a collision has occurred and it should stop transmitting.

That portion of the circuit 14 which is utilized to transfer signals from the computer 10 to the coaxial network 18 is, in general, well known to those skilled in the art. As will be understood from the description which follows, the individual elements of the circuitry have long been used to provide the functions for which they are used in the present invention to connect a computer bus to a coaxial network. However, a coaxial network has not previously been associated with a twisted pair network using a switching apparatus as in the present invention which allows the automatic selection of one or the other of the two networks to which the computer 10 is connected. Using the present invention, signals and data from both of the networks are transferred by the same conductors to reach the LAN controller 12. Since prior art connections to twisted pair networks do not generate either a collision signal or a CRS# signal, it is useful when utilizing the same paths for both connections to twisted pair and coaxial networks that the computer see the same control signals. For example, since the twisted pair network does not normally provide a carrier sensed signal, a computer may transmit into a faulty network without any indication. Moreover, the collision detection facility is especially useful in a twisted pair network to eliminate the problem of trashing data generated by a pair of computers transmitting on the same network. Consequently, it is useful to generate such collision and carrier-sensed signals for the twisted pair network 16 so that these benefits are provided to the computer 10 when either of the two types of networks is utilized.

Figures 2, 3:
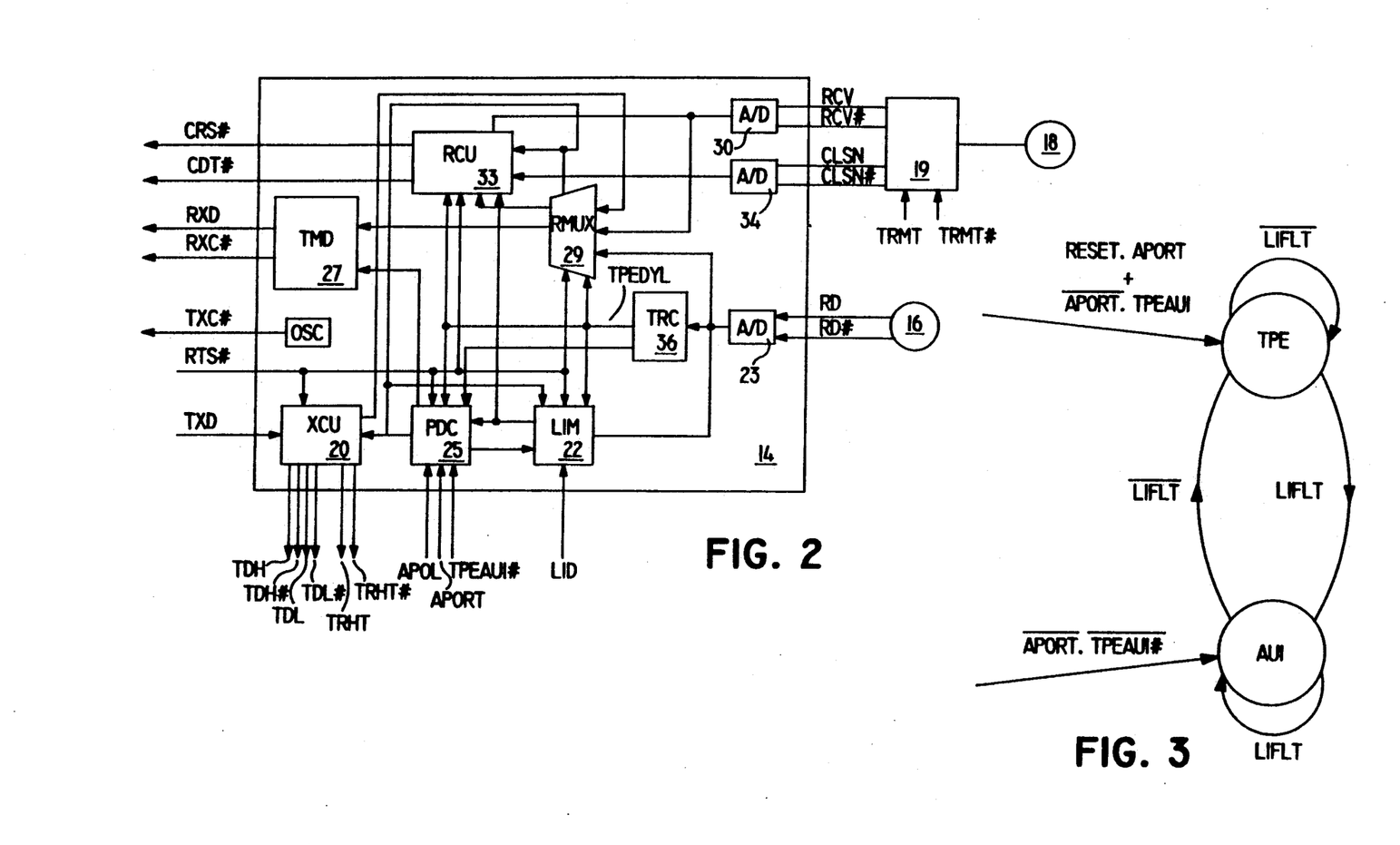
FIG. 2 is a detailed block diagram illustrating one portion of the arrangement illustrated in FIG. 1.
FIG. 3 is a state diagram illustrating states of the circuit 14 shown in FIG. 2.

FIG. 2 illustrates in block form the details of the circuit 14 by which the automatic selection of networks is accomplished. Four external control signals are provided for operating the circuit 14; an asserted APORT signal enables the automatic selection of a network in accordance with the present invention. In contrast, if the signal APORT is deasserted, a TPE/AUI# signal may be used to connect one or the other of the two available networks in the send/receive path depending on the polarity of the signal applied. By permanently grounding the APORT input, TPE/AUI# may be used to provide a switch between the two networks (a so-called "hardwired" selection). An APOL signal enables automatic polarity switching, and a LID signal disables testing of the twisted pair network connection integrity.

The circuit 14 includes a transmitter (XCU) circuit 20 which receives the request-to-send signal RTS# to commence its transmission and the data signals TXD from the LAN controller 12. The transmitter 20 generates the differential pairs of serial output signals TRMT and TRMT#, TDH and TDH#, and TDL and TDL# in response to the input data TXD under control of the other components of the circuit 14.

The request-to-send signal RTS# is also transferred to a link integrity (LIM) state machine 22 and a polarity detection circuit (PDC) 25. The link integrity state machine 22 monitors the input line upon which the RD and RD# differential signals normally appear to determine whether the twisted pair network 16 is active or not. The RD signals on the receive lines are translated by a analog-to-digital converter circuit 23 to digital signals, and these are monitored by the link integrity state machine 22. In accordance with the protocol for twisted pair ethernet networks, so long as the network is operating and not transferring data, single bit signals referred to as "link beats" are generated and transferred on the network AS DEFINED IN the 802.3 specification (a range from 2-25 milliseconds in the preferred embodiment). The link integrity state machine 22 detects these signals, and as long as they or data are present, generates a control signal (LIFLT#) indicating there is no link fault (an active network is connected). So long as the link integrity is assured by the LIFLT# signal, the transmitter 20 transmits any data from the computer 10 as output signals on the differential lines to the twisted pair network 16. If the link beats are missing and no data is being received on the twisted pair network 16, a signal generated by the link integrity state machine 22 causes the transmitter 20 to cease transmission and to switch to the coaxial network 18 in order to transmit any further data from the computer 10. The link integrity machine 22 may receive an external link integrity disable (LID) signal which overrides the link detection apparatus and causes the circuit 14 to operate continually in the twisted pair network mode.

The link integrity state machine 22 also provides the signals monitored on the received line from the twisted pair network 16 to the polarity detection circuit 25. One problem with twisted pair networks is that it is possible for a person to have inadvertently reversed the polarity of the conductors carrying the network signals quite easily. In such a case, a computer cannot detect data addressed to it. If an external signal APOL is asserted, the polarity detection circuit 25 determines whether the received signals RD and RD# are of proper polarity. This is accomplished by the circuit 25 determining the direction of the leading edge of a received signal; if of the wrong polarity, a signal is sent to cause a tracking-Manchester-encoded-data (TMD) circuit 27 the circuit which generates the serial data stream RXD and its associated clock RXC#) to correct the data signal (RXD) provided to the computer 10. Thus, a reversal of polarity by an incorrect connection of the twisted pair lines may be automatically corrected. The polarity detection circuit 25 also receives the two signals APORT and TPE/AUI# mentioned above which causes the circuit 14 to operate in either the automatic selection mode or the hardwired selection mode referred to above.

The TMD circuit 27 is a well known circuit used to translate signals encoded in Manchester code into digital signals which can be utilized by the computer 10. Such a circuit takes the digital signals produced by the analog-to digital converters from the analog signals which are received on either the coaxial network 18 or the twisted pair network 16 and generates the serial string of digital signals RXD and the associated clock RXC# which are transmitted to the LAN controller 12. The method for accomplishing this decoding and generation of a clock is well known in the art and is used typically to decode signals from such networks (e.g., Intel 82C501AD).

The Manchester encoded data signals are provided to the TMD circuit 27 by a receive multiplexor circuit 29. The receive multiplexor circuit 29 receives three inputs. These are the transmitted data signals from the transmitter 20 which are routed back to the LAN controller 12 if transmission is on the twisted pair network 16, the serial data from the analog-to-digital converter 23 which receives the incoming data on the twisted pair network, and the serial data transmitted by the MAU circuit 19 through another analog-to-digital converter circuit (whether from the coaxial network or returned from the transmission). The receive multiplexor 29 selects the particular one of the three possible streams of data to send to the LAN controller 12 depending on the network on which the received data is appearing, the condition of the twisted pair network link, and the network to which transmitted data is being directed.

Whenever data is received on the coaxial network 18 as an RCV pair signal and is translated to digital form by the analog-to-digital converter 30, a carrier received signal CRS# is generated by a receive control unit 33 and transferred back to the LAN controller 12. Similarly, when data is transmitted by the computer 10 through the LAN controller 12 and the circuit 14 to the MAU transceiver circuit 19, the MAU transceiver 19 returns the transmitted data to the receive multiplex circuit 29 and to the receive control unit 33 as the RCV signal; and a CRS# signal is again generated by the receive control unit 33. The LAN controller 12 transmitting data treats the CRS# signal as an affirmation that the signal is being correctly transmitted on the coaxial network. The LAN controller 12, when not transmitting data from the computer 10, treats the CRS# signal as an indication that data is being received from the coaxial network 18. In a similar manner, the receive control unit 33 receives digital collision data from the MAU circuit 19 via the digital-to-analog converter circuit 34 and generates a CDT# signal which is transferred to the LAN controller 12 to indicate that there is more than one computer transmitting on the coaxial network. The CDT# signal causes the LAN controller 12 to disable the transmission.

In order to generate similar control signals indicating the condition of the twisted pair network, the circuit 14 includes circuitry which monitors the received lines from the twisted pair network 16 and the signal RTS# from the LAN controller 12 and causes the receive control unit 33 to generate the CRS# and CDT# signals. The polarity detection circuit 25 referred to above and a TPE receive control circuit 36 cooperate with the link integrity state machine 22 to cause the receive control unit 33 to generate the CRS# and CDT# signals. The circuit 36 is a discriminator which measures the length and positive and negative excursions of data received on the twisted pair network to determine whether single bit link beats or data signals are being transferred. The circuit 36 provides a signal to the receive control unit 33 and the receive multiplexor circuit 29 indicating that data (rather than link beats) is being received while the link integrity machine 22 furnishes a signal to the polarity detection circuit 25 and the receive control unit 33 indicating the integrity of the twisted pair network 16.

When the LAN controller 1 is transmitting from the computer 10 to the twisted pair network 16, the receive multiplexor circuit 29 is controlled to send the data being transmitted back to the TMD circuit 27 to generate the received clock signals RXC# and the received data signals RXD. Thus, the transmission of signals on the twisted pair network 16 causes the transmitted data to be fed back in emulation of the behavior of the coaxial network 18. At the same time, the request-to-send signal RTS# and a signal indicating a good link to the twisted pair network from the link integrity machine 22 cause the receive control unit 33 to generate the CRS# signal. Thus during transmission, the return of data is accomplished by the receive multiplexor 29; and the receive control unit 33 emulates the CRS# signal to indicate that a carrier has been received on the twisted pair network 16.

The signals which are being received on the twisted pair network 16 are sent to the TPE receive control circuit 36 which discriminates between data and the link beat signals. Since a link beat is only one bit while data is transferred in packets on the twisted pair network 16, this discrimination is easily accomplished by discriminator circuitry well known in the art. When the TPE receive control circuit 36 detects data and the LAN controller 12 is not transmitting, the TPE receive control circuit 36 generates a signal TPEDVL which helps cause the receive control unit 33 to generate a CRS# signal for transfer to the LAN controller 12. Thus, the carrier received signal is also emulated for the twisted pair network 16 by the circuit 14 during receipt of data.

In order to generate the CRS# signal, a signal from the link integrity state machine 22 indicating that the network 16 is active is also required. The link integrity state machine 22 monitors the twisted pair network 16 for received signals. So long as it senses the link beat signals or data, it generates the signal LILFT# indicating a good connection to the twisted pair network. If link beats or data are missing from the receiving input terminals, the signal LIFLT (link false) is generated; and the circuit 14 understands that the receiving circuit on the twisted pair network 16 is not working correctly. This signal is transferred to the polarity detection circuit 25 and to the receive control unit 33. At the same time, the TPE receive control circuit 36 detects the presence of data on the receiving lines and sends a signal TPRDVL to indicate this to the receive control unit 33. The presence of the data incoming signals from the link integrity state machine 22 and the TPE receive control circuit 36 causes the receive control unit 33 to generate the CRS# signal to indicate that data is being received.

Similarly, the circuit 14 generates a collision detection signal by observing the signals on the twisted pair network 16. The link integrity state machine 22 monitors the twisted pair network 16 for received signals. So long as it senses the link beat signals or data, it generates the signal LIFLT# and sends this to the receive control unit 33. The TPE receive circuit 36 determines whether the signal received is data and sends a signal TPEDVL indicating data to the receive control unit 33. If the received signal is data and the RTS# signal is asserted, the receive control unit 33 determines that a collision is occurring on the twisted pair network and asserts the signal CDT# to indicate that a collision is occurring.

The circuit 25 receives the external control signals APORT and TPE/AUI# which control the manner of operation. As pointed out above, the APORT signal selects the automatic switching mode when high and one of the fixed modes when low. When the signal APORT is low, the signal TPE/AUI# selects the coaxial network when it is low and the twisted pair network 16 when it is high. If the APORT signal is asserted in the presence of the link fault LIFLT signal, the polarity detection circuit 25 generates a signal ITPE/AUI# which causes the receive control unit 33 to deassert the CRS# signal should there be transmission activity at the time to inform the LAN controller 12 that the twisted pair network 16 is bad. This signal from the circuit 25 will cause the circuit 14 to switch to the coaxial network 18 and inhibit transmission of any data packet in progress. This signal from the polarity detection circuit 25 causes the transmitter 20 selecting the coaxial output signal paths and causes the receive multiplexor 29 to select signals transferred from the MAU transceiver 19 of the coaxial network 18. The circuit 14 will switch the transmission back to the twisted pair network 16 during an idle state after the LIFLT# signal becomes true after detecting a series of link beats on the twisted pair network 16 or the receipt of data.

FIG. 3 is a state diagram illustrating the conditions of the circuit 14 during the operations described above. As may be seen, the circuit 14 is placed in a condition to transmit on the twisted pair network 16 in response to an external reset signal when the automatic switching signal APORT is asserted. It is also placed in this condition when APORT is not asserted in response to an input on the TPE/AUI# input placing the polarity detection circuit 25 in a condition so that the twisted pair network 16 is used. The circuit 14 remains connected to transmit on the twisted pair network 16 until the receipt of a link fault signal LIFLT. This causes the circuit to move (during an idle period) to the state in which transmission occurs on the coaxial network 18. The circuit 14 remains connected to the coaxial network 18 during the continuation of the link fault signal. It will, of course, remain on the coaxial network if a TPE/AUI# signal sets it in that condition when the APORT signal is not asserted. The circuit 14 moves back to transmit on the twisted pair network 16 when the link fault signal is removed during the presence of an idle condition.

Figure 4:
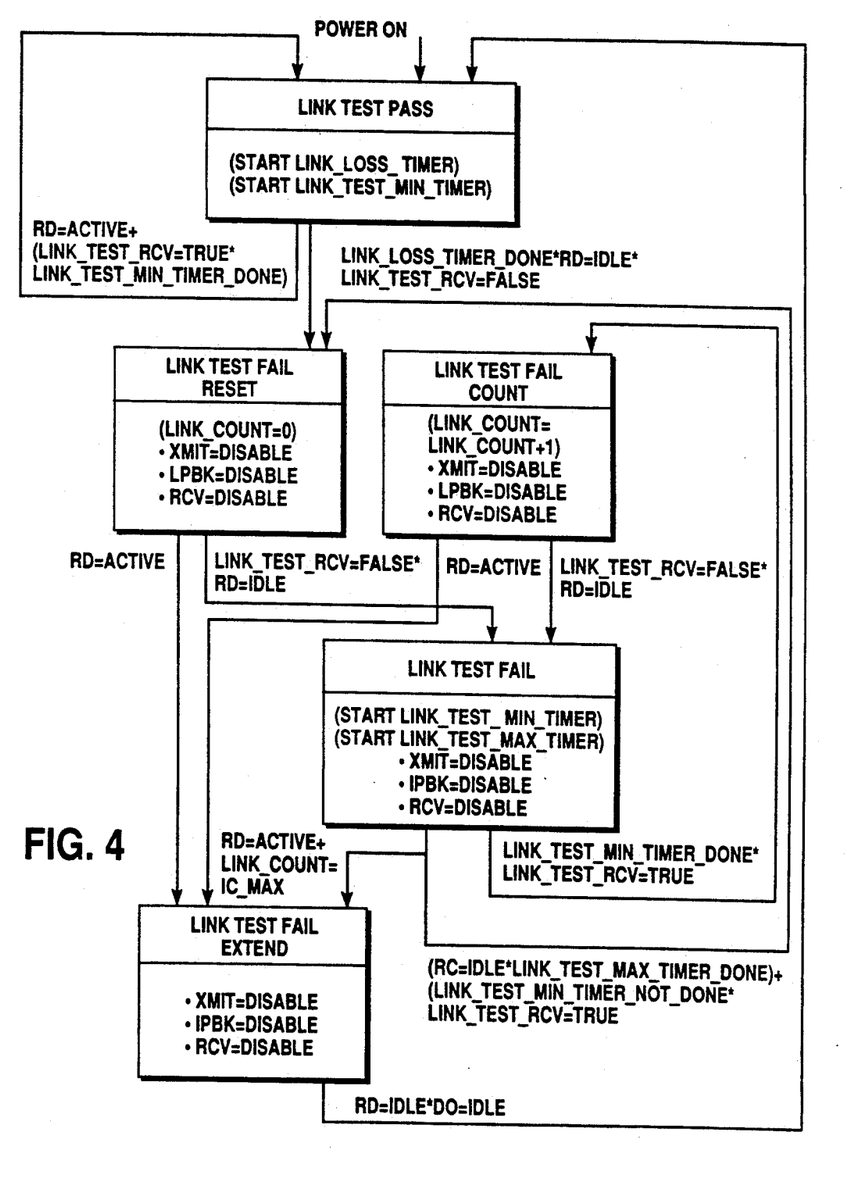
FIG. 4 is a state diagram illustrating the conditions which exist during operation in a portion of the circuit 14 of FIG. 2.

FIG. 4 is a diagram of a state machine (which may be a programmable logic array) used as the link integrity state machine 22. FIG. 4 illustrates the operation of the link integrity state machine 22 in monitoring the receive lines of the twisted pair network 16 in order to determine whether the circuitry is operating correctly. When the receive lines are connected to a twisted pair network 16 which is functioning and the power is turned on, the apparatus will be in a LINK TEST PASS state. In this state the signal RD is being received. This is determine by monitoring the conductors upon which the RD signal is being received.

Either link beats or data must be received within a minimal period of time (typically 150 milliseconds). So long as either is received, the link integrity state machine 22 remains in the LINK TEST PASS state and will generate a signal LIFLT# indicating that a network is connected and operating. If the link beats or data are not received for the a period longer than the prescribed period (when the link is lost), the link integrity state machine 22 moves to a LINK TEST FAIL RESET state.

In the LINK TEST FAIL RESET state, the link integrity state machine 22 disables the twisted pair side of the transmitter 20 so that it is not sending data from the computer 10 to the twisted pair network 16, disables the feedback of data by switching the receive multiplexor 29 so that data is not fed back to the LAN controller 12 from the transmitter 20, and disables the transmission of the CRS# signal by the receive control unit 33. If no signals are received on the twisted pair network 16 so that the link test continues to furnish a false signal, the link integrity state machine 22 moves to a LINK TEST FAIL state. In this state, a timer is started to initiate a period during which link beat or data appearances are to be tested; and the transmission and feedback of information and the generation of the CRS# signal all remain disabled. In this state, the link integrity state machine 22 looks for link beats or data.

If a link beat is received within the allotted period, the link integrity state machine 22 moves to a state LINK TEST FAIL COUNT where the number of link beats received is incremented. From the LINK TEST FAIL COUNT state, the link integrity state machine 22 returns to the LINK TEST FAIL STATE until three link beats are counted within a selected period of time (less than 150 milliseconds) or data is received on the twisted pair network 16. During this state, the transmission and feedback of information on the twisted pair network 16 and the generation of the CRS# signal all remain disabled.

If the link integrity state machine 22 counts three link beats within a selected period of time (less than 150 milliseconds) while circulating through the LINK TEST FAIL state or if data is received on the twisted pair network 16 (RD =active as determined by the TPE receive control circuit 30) in any of the states LINK TEST FAIL, LINK TEST FAIL COUNT, or LINK TEST FAIL RESET, then the link integrity state machine 22 moves to a LINK TEST FAIL EXTEND state. In this state, the transmission and feedback of information and the generation of the CRS# signal all remain disabled; and the link integrity state machine 22 waits for an idle state of the circuit 14 in which to switch back to the twisted pair network 16. Once the idle condition occurs, the link integrity state machine 22 moves to the LINK TEST PASS state in which the transmission of data by the computer, the feedback of data, and the generation of the CRS# signal may be initiated.

Figure 5:
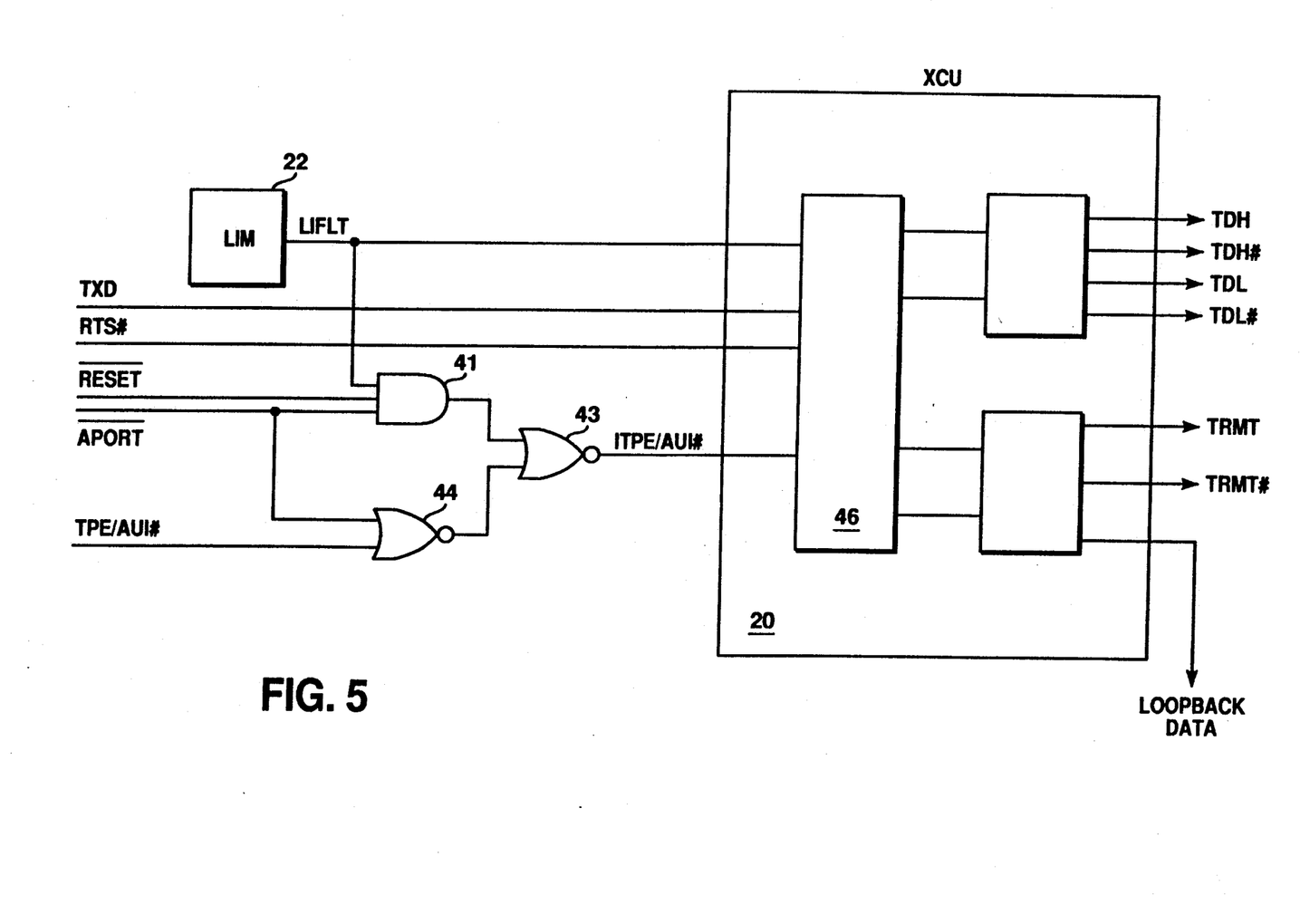
FIG. 5 is a circuit diagram illustrating portions of the circuitry shown in FIG. 2.

FIG. 5 illustrates the portion of circuit 14 utilized to accomplish the automatic switching described above. As may be seen, the link integrity state machine 22 provides the LIFLT signal which activates the automatic switching operation. The LIFLT signal indicates the absence of input on the twisted pair network 16 and is transferred to the input of an AND gate 41. The AND gate 41 also receives a signal indicating that the system has not just been turned on (not reset) and a signal APORT indicating that the automatic switching mode is on. When these signals are present (when there is a link fault in the automatic mode and a reset is not present), a one value signal is presented to a NOR gate 43. The NOR gate 43 provides a signal ITPE/AUI# which controls the transmitter 20 to operate in the state in which output is sent to the coaxial network 18.

The NOR gate 43 will produce a one value output to select the twisted pair network 16 only when both input values are zero. The AND gate 41 will furnish a zero if autoselect mode is not on or if a link fault signal is furnished when autoselect is on. A second NOR gate 44 furnishes a zero when autoselect is on or the TPE-/AUI# input signal is high indicating a twisted pair network hardwired select. The gate 44 will furnish a one only when autoselect is off and TPE/AUI# is low signifying the externally-selected coaxial state; this one value causes the gate 43 to furnish a zero and select the coaxial network option. Thus, whenever autoselect (APORT) is on, the output of the NOR gate 43 depends on the presence or absence of a link fault signal LIFLT. A link fault signal generates a one at the input to the gate 43 and a zero out to enable the coaxial mode. An absence of the link fault signal LIFLT causes the gate 43 to generate a one and select the twisted pair network 16.

This ITPE/AUI# signal is furnished at a transmitter control circuit 46 within the transmitter 20 and selects the appropriate network for transmission of the data. The transmitter control circuit 46 also receives the link fault signal LIFLT as an input so that it may disable a transmission in progress on the twisted pair network 16 when a link fault occurs. It also receives the request to send signal RTS# as an input so that it may disable a transmission occurring on the twisted pair network 116 rather than switching the transmission directly to the coaxial network 18. The switch must await an idle condition on the coaxial network 18 and a new request to send so that it will not generate a data collision on the coaxial output lines.

Figure 6:
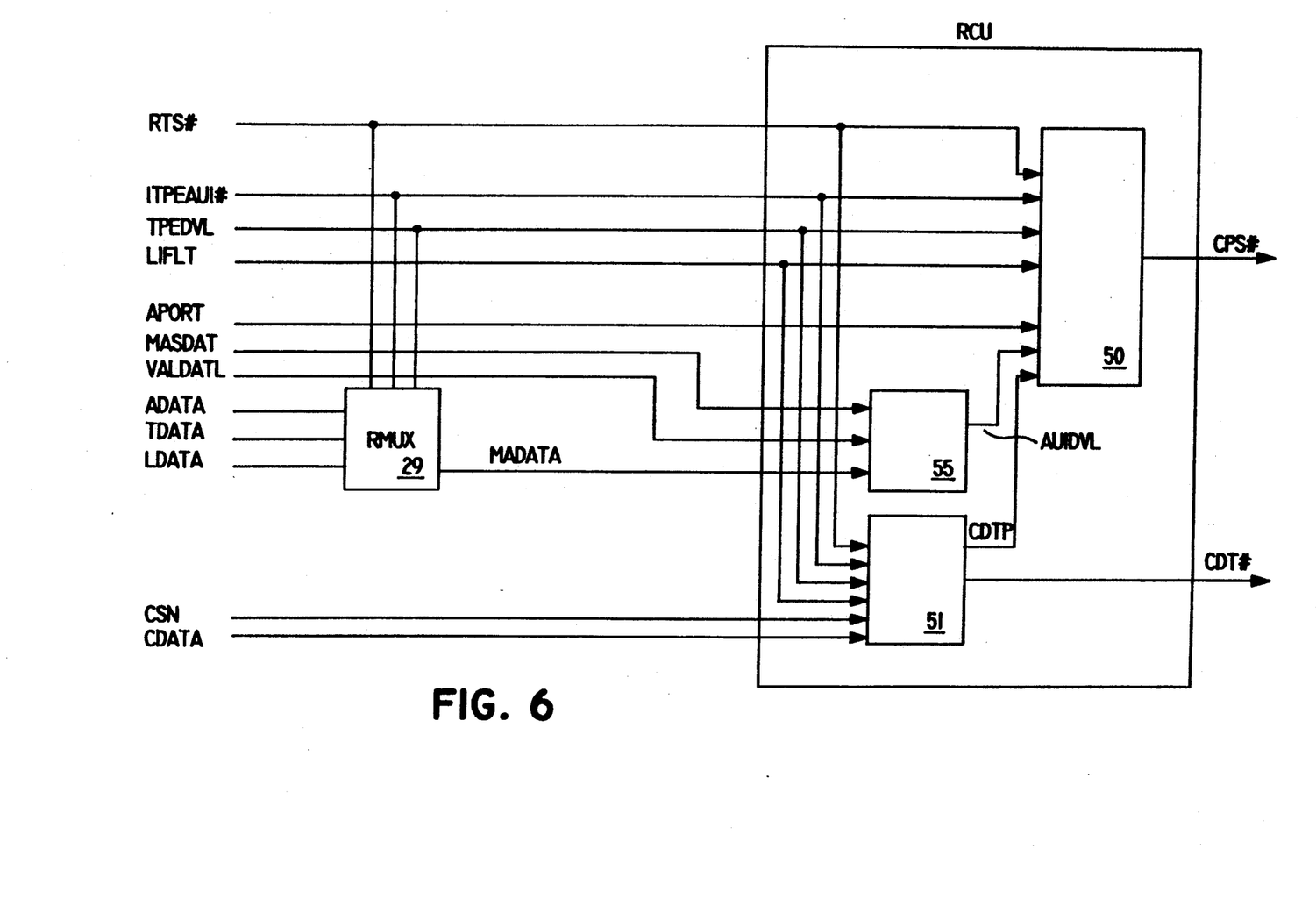
FIG. 6 is another circuit diagram illustrating portions of the circuitry shown in FIG. 2.

FIG. 6 illustrates in block diagram form the receive control unit 33. The receive control unit 33 includes a signal generator 50 which produces the carrier-sensed signal CRS# and a second signal generator 51 for producing the collision signal CDT#. The two generators 50 and 51 each have a set of input gates which cause the generation of the respective output signals when the appropriate input signals appear as is explained below. The signal generator 51 produces the output signal CDT# when it receives a collision pair of signals CLSN and CLSN# (shown as CLS) from the MAU transceiver 19 and a signal CDATA indicating that valid data is being transmitted on the coaxial network. The signal generator 51 also produces an output signal CDT# when it receives an appropriate ITPE/AUI# signal indicating operation in the twisted pair mode, a RTS# signal indicating transmission on the twisted pair network 16 is occurring, and a TPEDVL signal from the TPE receive control circuit 36 indicating that data is also being received on the twisted pair network 16. When the CDT# signal is received by the LAN controller 12, the LAN controller 12 treats it as though a collision had occurred and stops the transmission of signals from the computer 10. The CDT# signal is also transferred to the generator 50 to enable the production of the CRS# signal from that generator when a collision occurs.

In a similar manner, a request-to-send signal RTS# and an ITPE/AUI# indicating the twisted pair network mode of operation cause the circuit 50 to generate a CRS# signal indicating that a carrier has been received. The circuit 50 also responds to the signal TPEDVL from the circuit 36 indicating that there is received data on the twisted pair network 18 by a generating a CRS# signal when the ITPE/AUI# signal indicates the twisted pair mode of operation.

The LIFLT signal disables the generator 50 so that the CRS# signal is absent when a link fault occurs in the twisted pair mode. The APORT signal indicates the automatic switching mode to the CRS# signal generator 50 so that the generators 50 will react to the twisted pair operations when the ITPE/AUI# signal is present to indicate that mode. The three different data streams at the receive multiplexor 29 variously generate the signal MADATA indicating the presence of data from either the coaxial or twisted pair network; the particular data stream selected depend on the control signals RTS#, TPEDVL, and ITPE/AUI# which indicate the mode of operation. This MADATA signal along with two signals from the MAU 19 which indicate the existence of valid data at the MAU 19 (either received data or transmitted data which is looped back by the MAU 19) cause a signal generator 55 to generate a signal AUIDVL indicating to the generator 50 that a valid signal exists on the coaxial network 18. This AUIDVL signal, like the TPEDVL signal from the twisted pair network, is used to cause the generator 50 to produce the CRS# signal for the coaxial network.

Thus, when the two signals APORT and ITPE/AUI# indicate the twisted pair mode, the generator 50 produces the CRS# signal in response to the TPEDVL signal, while when two signals APORT and ITPE/AUI indicate the coaxial mode, the generator 50 produces the CRS# signal in response to the AUIDVL signal. Similarly, in the twisted pair mode the RTS# and TPEDVL signals produce the collision signal CDT#, while in the coaxial mode the CLS and CDATA signals produce the CDT# signal.

In this manner the circuitry of the present invention allows a pair of different networks to be connected to the same computer and automatically route data by the most appropriate path.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus coupled to a source of data, a coaxial network and a twisted pair network for automatically switching network connection of the source of data between the coaxial network and the twisted pair network depending on an operability of the twisted pair network comprising:

(A) means for normally connecting the source of data to the twisted pair network;

(B) means for monitoring the operability of the twisted pair network to determine if the twisted pair network is operational;

(C) means coupled to the means for monitoring the operability of the twisted pair network for connecting the source of data to the coaxial network when the means for monitoring the operability of the twisted pair network detects that the twisted pair network is not operational;

(D) means for generating a carrier sensed signal based on the data transmission between the source of data and the twisted pair network, wherein the means for generating the carrier sensed signal further comprises;

(i) means coupled to the twisted pair network for detecting when data is being received on the twisted pair network, (ii) means coupled to the source of data and the coaxial network for generating a carrier sensed signal in response to the data transmission from the source of data to the coaxial network, and (iii) means coupled to (1) the means for monitoring, (2) the means for detecting, and (3) the means for generating the carrier signal for causing the means for generating the carrier sensed signal to generate the carrier sensed signal in response to the data transmission on the twisted pair network when (1) the means for monitoring detects that the twisted pair network is operational and (2) the means for detecting detects that data is being received on the twisted pair network.

2. The apparatus of claim 1 further comprising means for returning the data being transmitted from the source of data to the twisted pair network back to the source of data.

3. The apparatus of claim 2, wherein the means for returning the data being transmitted from the source of data to the twisted pair network back to the source of data comprises means for returning data transmitted from the source of data to the coaxial network.

4. The apparatus of claim 1, wherein the means for connecting also switches the network connection of the source of data to the twisted pair network when the means for monitoring the operability of the twisted pair network detects that the twisted pair network is operational.

5. The apparatus of claim 1, wherein the means for connecting further comprises:

(a) means for causing the source of data to stop transmitting the data to the twisted pair network;

(b) means for detecting when the source of data is not transmitting any data; and (c) means for connecting the source of data to the coaxial network when the source of data is not transmitting any data.

6. An apparatus coupled to a source of data, a coaxial network and a twisted pair network for automatically switching network connection of the source of data between the coaxial network and the twisted pair network depending on an operability of the twisted pair network comprising:

(A) means for normally connecting the source of data to the twisted pair network for data transmission;

(B) means for monitoring the operability of the twisted pair network to determine if the twisted pair network is operational;

(C) means coupled to the means for monitoring the operability of the twisted pair network for connecting the source of data to the coaxial network when the means for monitoring the operability of the twisted pair network detects that the twisted pair network is not operational;

(D) means for generating a collision signal when an attempt is made to transmit a first data from the source of data to the twisted pair network when a second data is being received from the twisted pair network to the source of data wherein the means for generating the collision signal further comprises:

(i) first means coupled to the twisted pair network for detecting when the first data is being transmitted to the twisted pair network, (ii) second means coupled to the twisted pair network for detecting when the second data is being received from the twisted pair network, (iii) third means coupled to the source of data and the coaxial network for generating the collision signal when the source of data is attempting to transmit a third data to the coaxial network when a fourth data is being received from the coaxial network to the source of data, and (iv) fourth means coupled to the first, second, and third means and to the means for monitoring for causing the third means to generate the collision signal to the source of data when (1) the means for monitoring detects that the twisted pair network is operational and (2) the first means detects that the first data is being transmitted to the twisted pair network when the second means detects that the second data is being received from the twisted pair network such that the collision signal can be generated when the first and second data are being transmitted on the twisted pair network.

7. The apparatus of claim 6, wherein the means for connecting also switches the network connection of the source of data to the twisted pair network when the means for monitoring the operability of the twisted pair network detects that the twisted pair network is operational.

8. The apparatus of claim 6, wherein the means for connecting further comprises:

(a) means for causing the source of data to stop transmitting the data to the twisted pair network;

(b) means for detecting when the source of data is not transmitting any data; and (c) means for connecting the source of data to the coaxial network when the source of data is not transmitting any data.

* * * * *

UNITED STATES PATENT AND TRADEMARK OFFICE
CERTIFICATE OF CORRECTION

PATENT NO. : 5,289,458
DATED : February 22, 1994
INVENTOR(S) : Bassem Taha

It is certified that error appears in the above-indentified patent and that said Letters Patent is hereby corrected as shown below:

Col. 8, Line 5    Delete "1"    Insert --12--

Signed and Sealed this

Twenty-seventh Day of September, 1994

BRUCE LEHMAN

Attest:

Attesting Officer    Commissioner of Patents and Trademarks